United States Patent
Zolotov

(10) Patent No.: US 11,062,102 B2
(45) Date of Patent: Jul. 13, 2021

(54) DECODING INDICIA WITH POLARIZED IMAGING

(71) Applicant: SYMBOL TECHNOLOGIES, LLC, Lincolnshire, IL (US)

(72) Inventor: Serguei N. Zolotov, Ottawa (CA)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 16/170,174

(22) Filed: Oct. 25, 2018

(65) Prior Publication Data

US 2019/0130149 A1     May 2, 2019

Related U.S. Application Data

(62) Division of application No. 14/226,056, filed on Mar. 26, 2014, now Pat. No. 10,140,489.

(51) Int. Cl.
| | |
|---|---|
| *G06K 19/00* | (2006.01) |
| *G06K 7/10* | (2006.01) |
| *G06K 7/14* | (2006.01) |
| *G06K 7/12* | (2006.01) |

(52) U.S. Cl.
CPC ..... *G06K 7/10831* (2013.01); *G06K 7/10722* (2013.01); *G06K 7/10732* (2013.01); *G06K 7/12* (2013.01); *G06K 7/1465* (2013.01)

(58) Field of Classification Search
CPC .. G06K 7/10831; G06K 7/10732; G06K 7/12; G06K 7/10722; G06K 7/1465
USPC ................. 235/435, 439, 454, 462
See application file for complete search history.

(56) References Cited

U.S. PATENT DOCUMENTS

| | | | |
|---|---|---|---|
| 2003/0201327 A1* | 10/2003 | Jam ....................... | G02B 7/102 235/462.22 |
| 2004/0112962 A1* | 6/2004 | Farrall .................... | G06K 7/12 235/462.01 |
| 2011/0163163 A1* | 7/2011 | Rowe ................. | G06K 9/00046 235/462.25 |
| 2012/0067955 A1 | 3/2012 | Rowe | |
| 2012/0181329 A1 | 7/2012 | Grafton et al. | |
| 2013/0146665 A1 | 6/2013 | Havens et al. | |
| 2013/0293888 A1 | 11/2013 | Zhao | |

OTHER PUBLICATIONS

International Search Report and Written Opinion for International Application No. PCT/US2015/019923 dated May 6, 2015.

\* cited by examiner

*Primary Examiner* — Matthew Mikels
(74) *Attorney, Agent, or Firm* — Yuri Astvatsaturov

(57) ABSTRACT

A method of decoding one or more barcodes on a target object with an imaging scanner is described. The imaging scanner comprises an image sensor and a dynamic linear polarizer. The method includes the following: (1) capturing at least one image of the target object through the dynamic linear polarizer with the imaging sensor while the dynamic linear polarizer is set to a different defined polarization during each of N time periods; and (2) processing at least N images of the target object to decode the one or more barcodes on the target object. At least one image that is captured during each of the N time periods. Here, N is an integer that can be three, four, five, six, or other natural numbers.

12 Claims, 8 Drawing Sheets

DECODING INDICIA WITH POLARIZED IMAGING

CROSS-REFERENCE TO RELATED APPLICATIONS

The present application is a divisional application of U.S. patent application Ser. No. 14/226,056, filed on Mar. 26, 2014, and incorporated herein by reference in its entirety.

BACKGROUND

Various electro-optical systems have been developed for reading optical indicia, such as barcodes. A barcode is a coded pattern of graphical indicia comprised of a series of bars and spaces of varying widths. In a barcode, the bars and spaces have different light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. A imaging sensor generally includes a plurality of photosensitive elements or pixels aligned in one or more arrays. Examples of imaging sensors include charged coupled devices (CCD) or complementary metal oxide semiconductor (CMOS) imaging chips.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
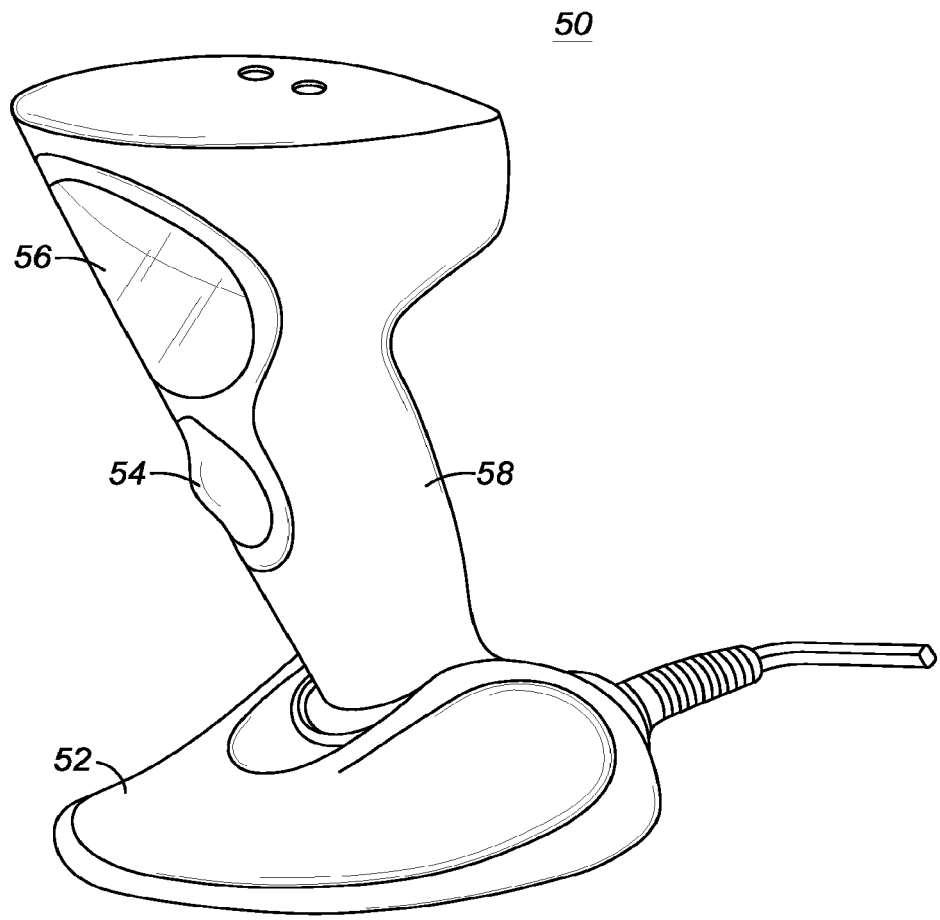
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method of decoding one or more barcodes on a target object with an imaging scanner is described. The imaging scanner comprises an image sensor and a dynamic linear polarizer. The dynamic linear polarizer is configured to block light with polarization perpendicular to a defined polarization direction. The method includes the following: (1) capturing at least one image of the target object through the dynamic linear polarizer with the imaging sensor while the dynamic linear polarizer is set to a different defined polarization during each of N time periods; and (2) processing at least N images of the target object to decode the one or more barcodes on the target object, wherein the at least N images includes the at least one image that is captured during each of the N time periods. Here, N is an integer that can be three, four, five, six, or other natural numbers.

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
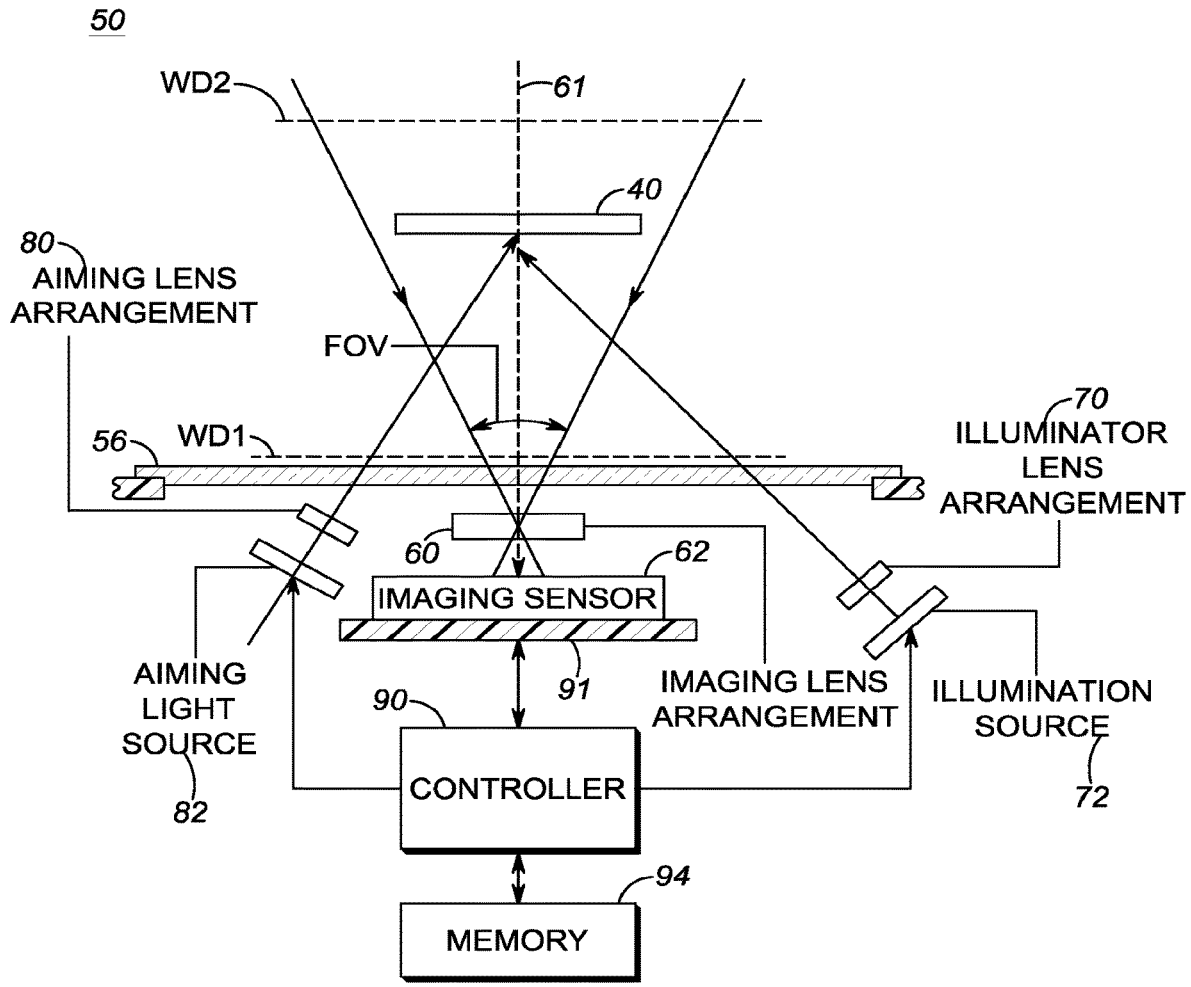
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination source 72; (3) an aiming lens arrangement 80 positioned in front of an aiming light source 82; and (4) a controller 90. In FIG. 2, the imaging lens arrangement 60, the illuminating lens arrangement 70, and the aiming lens arrangement 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56.

Generally, the imaging sensor 62 and the imaging lens arrangement 60 are designed to operate together for capturing light scattered or reflected from a barcode 40 as pixel data over a two-dimensional field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. In FIG. 2, the illuminating lens arrangement 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming lens arrangement 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the imaging sensor 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

One of the challenges for the imaging scanner 50 for reading barcodes is to read through glass, plastic or shrink wrap. One of the reasons for unsatisfactory performance is surface reflection. Imager illumination beam reflects from glossy surface that suppresses reflected signal from the target. To overcome such reflection, some of the imaging scanners use polarized illumination beam for illuminating the target. For example, the p-polarized light (electrical field is parallel to the surface) component less affected by reflection when going through more dense medium, while s-polarized component reflects more. To reduce reflection of the illumination from the translucent surface, illumination beam can use p-polarized to the surface light.

Because the operations of the imaging scanner 50 can introduce other challenges. System may need to be omni-directional, because surface geometry can be unknown or variable (plastic or shrink wrap). Thus, one part of the code may be covered with wrap shrink in one direction of the surface while another with wrap shrink in other direction. Single polarization of light may not be able to minimize reflections under all circumstance.

Figure 3A:
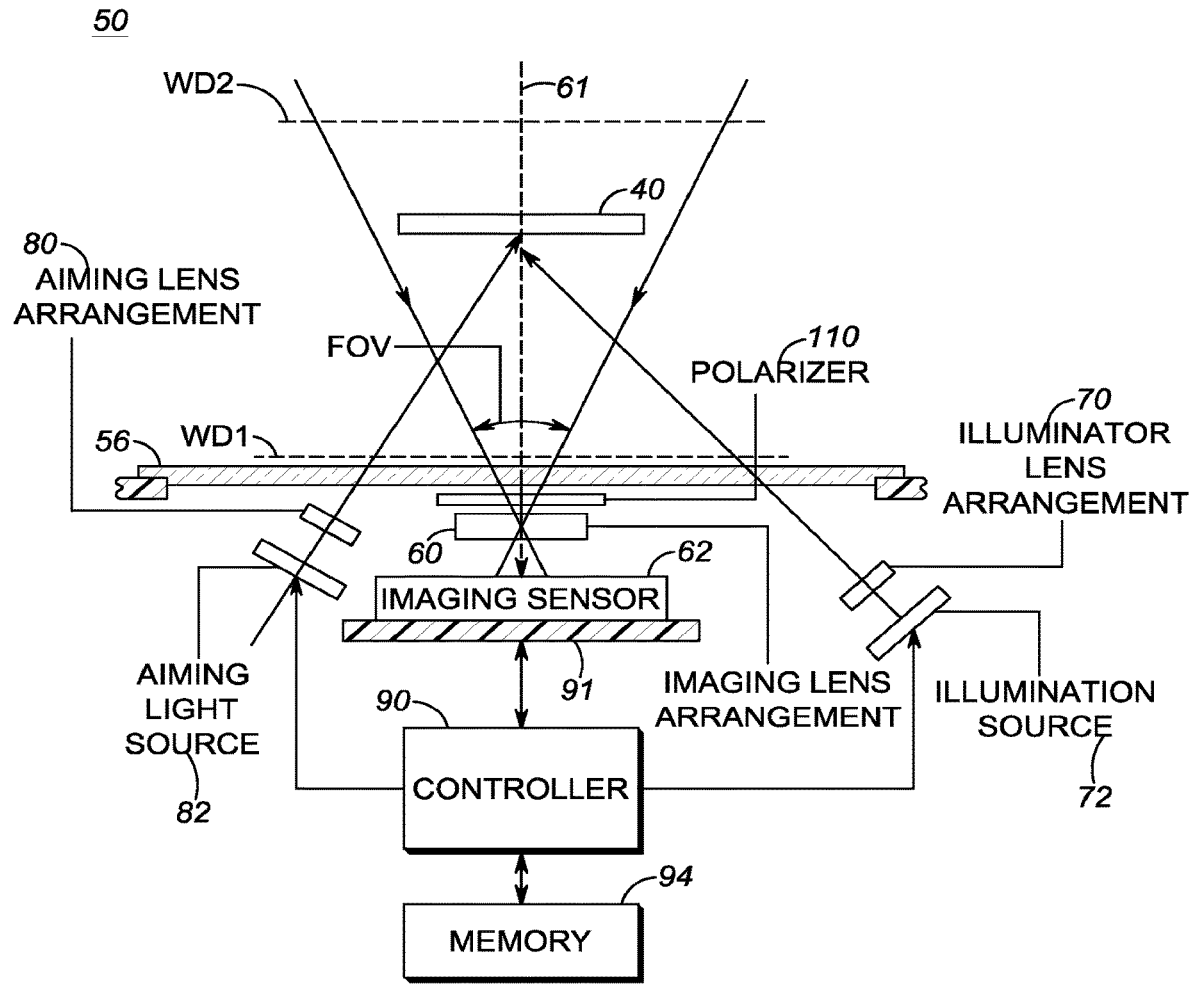
FIGS. 3A-3C are schematics showing implementations of the imaging scanner that includes at least one of a dynamic linear polarizer and an auxiliary dynamic linear polarizer.
Figure 4:
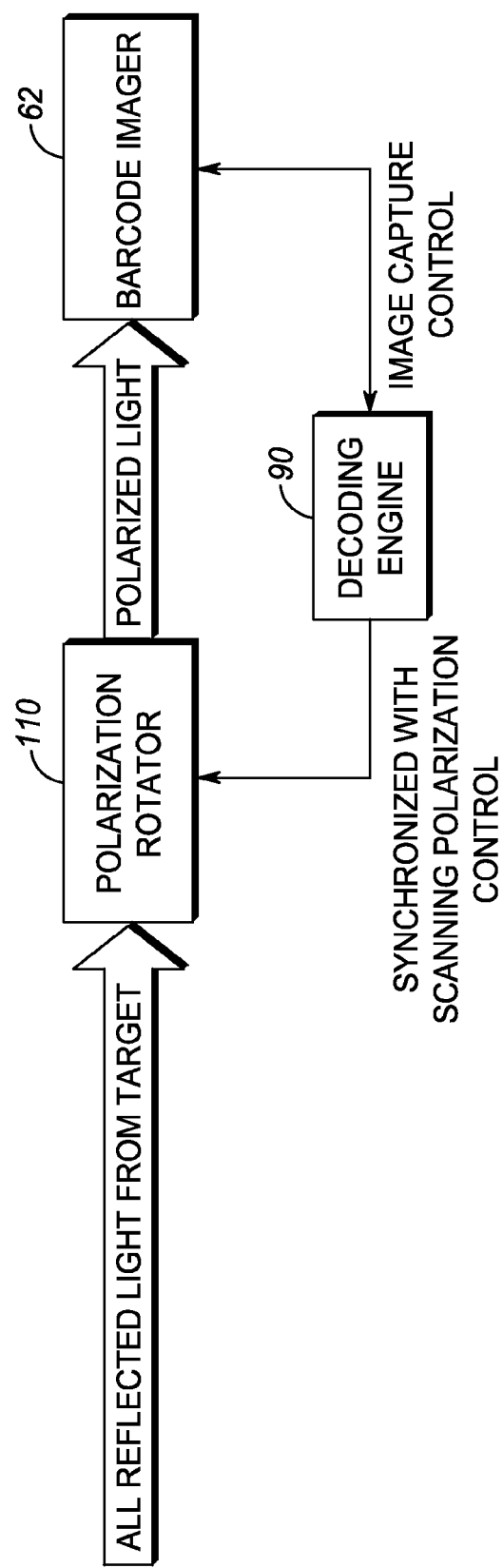
FIG. 4 is a schematic of the controller having the decoding engine synchronized with the scanning polarization control for the dynamic linear polarizer in accordance with some embodiments.

To overcome the omni-directional challenge during the operations of the imaging scanner 50, in some implementations, light polarization can be altered with every frame, i.e. image capture, so that the imaging scanner 50 can have chance to work on images captured with different direction of light polarization. In one implementation, as shown in FIG. 3A, the imaging scanner 50 includes a dynamic linear polarizer 110 and an imaging sensor 62 that is configured to capture at least one image of the target object 40 through the dynamic linear polarizer 110 with the imaging sensor while the dynamic linear polarizer is set to a different defined polarization during each of N time periods. Depending upon the implementation details, the integer N can be three, four, five, six, or other natural numbers. In FIG. 3A, the controller 90 is configured to process at least N images of the target object to decode the one or more barcodes on the target object. Here, at least one image is captured during each of the N time periods. In some implementations, as shown in FIG. 4, the decoding engine of the controller 90 can be synchronized with the scanning polarization control for the dynamic linear polarizer 110.

In some implementations, the imaging lens arrangement 60 can be positioned between the dynamic linear polarizer 110 and the imaging sensor 62. In some implementations, the dynamic linear polarizer 110 can be positioned between the imaging lens arrangement 60 and the imaging sensor 62.

Figure 3B:
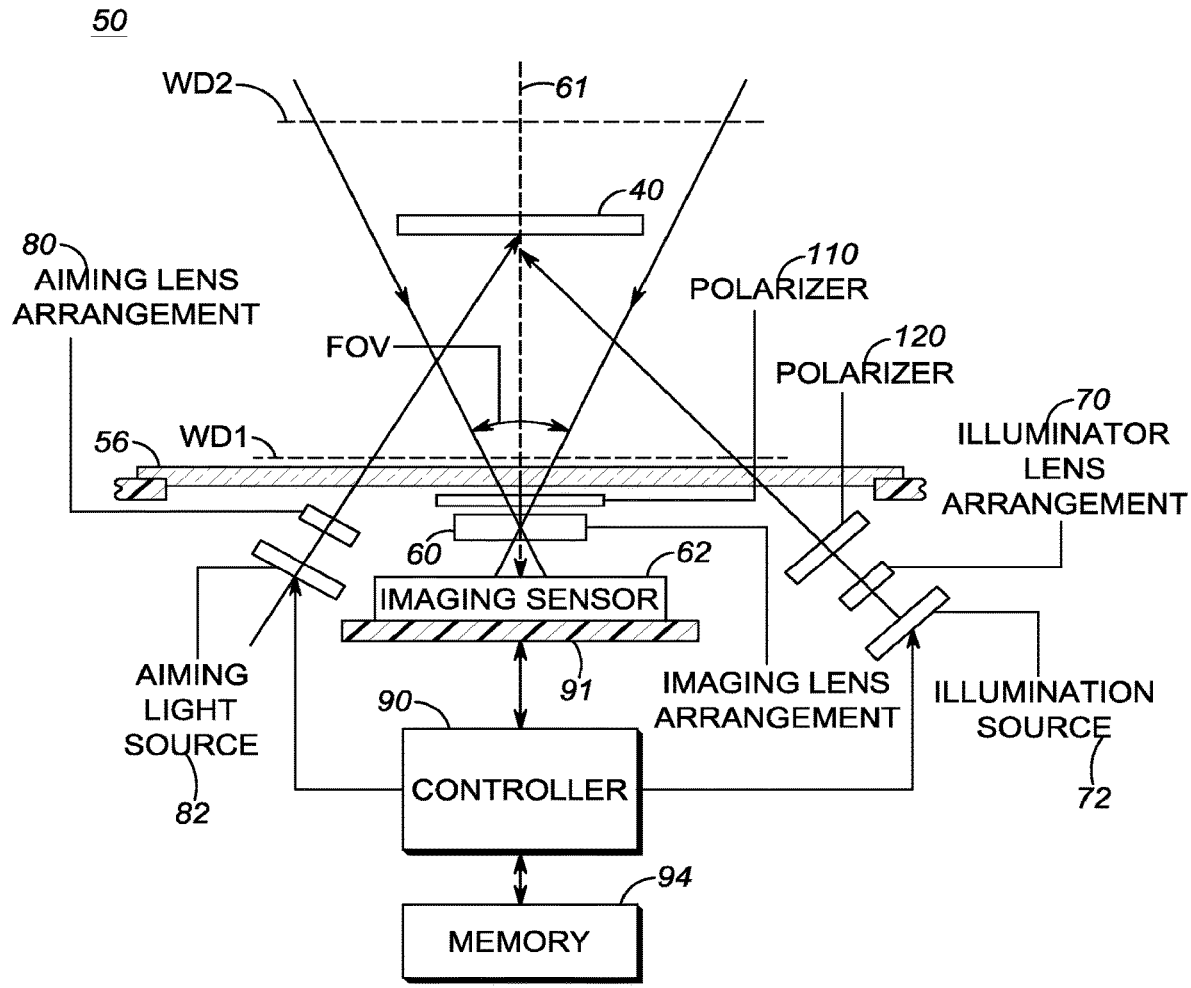

FIG. 3B shows another implementation of the imaging scanner 50. The imaging scanner 50 in FIG. 3B includes a dynamic linear polarizer 110, an auxiliary dynamic linear polarizer 120, and an imaging sensor 62 configured to capture at least one image of the target object 40 through the dynamic linear polarizer 110 with the imaging sensor 62 while the dynamic linear polarizer 110 is set to a different defined polarization during each of N time periods. Depending upon the implementation details, the integer N can be three, four, five, six, or other natural numbers. In FIG. 3B, the controller 90 is configured to process at least N images of the target object to decode the one or more barcodes on the target object. Here, at least one image is captured during each of the N time periods. The dynamic linear polarizer 110 and the auxiliary dynamic linear polarizer 120 can be synchronized with each other. The auxiliary dynamic linear polarizer 120 can be configured to generate illumination light by passing light from the illumination light source 72 through the auxiliary dynamic linear polarizer 120 while the auxiliary dynamic linear polarizer 120 is set to a corresponding defined polarization direction during each of the N time periods.

Figure 3C:
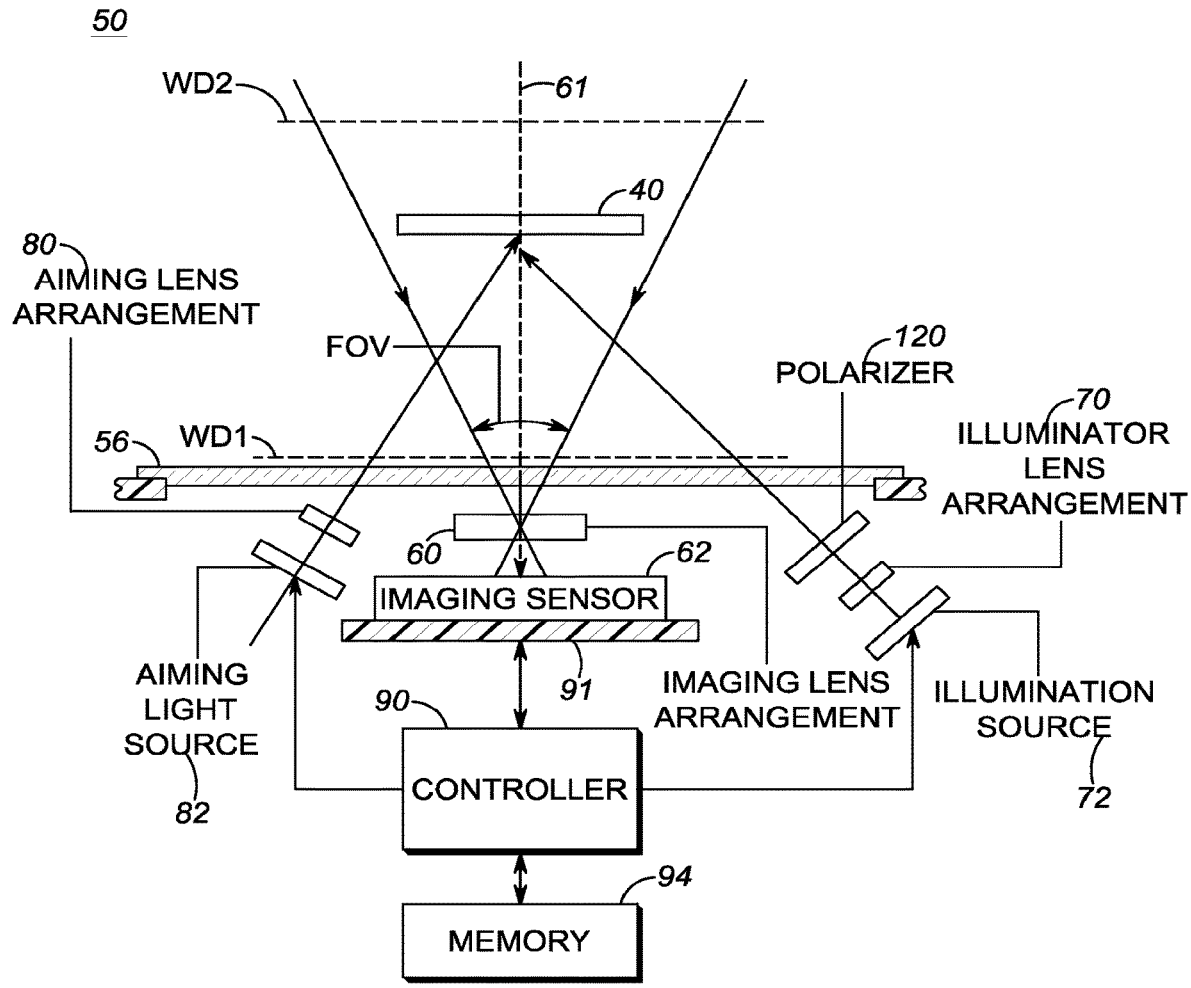

FIG. 3C shows still another implementation of the imaging scanner 50. The imaging scanner 50 in FIG. 3C includes an auxiliary dynamic linear polarizer 120 and an imaging sensor 62. The imaging sensor 62 is configured to capture at least one image of the target object while the target object is illuminated by the illumination light through the auxiliary dynamic linear polarizer 120 during each of the N time periods. Depending upon the implementation details, the integer N can be three, four, five, six, or other natural numbers. In FIG. 3C, the controller 90 is configured to process at least N images of the target object to decode the one or more barcodes on the target object. Here, at least one image is captured during each of the N time periods.

In the imaging scanner 50 as shown in FIG. 3A, FIG. 3B, or FIG. 3C, each of the dynamic linear polarizer 110 and the auxiliary dynamic linear polarizer 120 can include a polarization rotator in accordance with some embodiments. The polarization rotator can be an electro-optical device that rotates light polarization when applying electrical field or mechanical force that rotates polarization slow enough or non-continuous to let single image capture to complete.

In some implementations of the apparatus, each of the dynamic linear polarizer 110 and the auxiliary dynamic linear polarizer 120 can include (1) a linear polarizer configured to block light with polarization perpendicular to a fixed polarization direction, and (2) a polarization rotator that includes liquid crystal material sandwiched between two transparent conducting plates.

In some implementations of the apparatus, each of the dynamic linear polarizer 110 and the auxiliary dynamic linear polarizer 120 can include (1) a linear polarizer configured to block light with polarization perpendicular to a fixed polarization direction and (2) a polarizer holder for holding the linear polarizer, and the polarizer holder is configured to mechanically rotate the linear polarizer.

Figure 5:
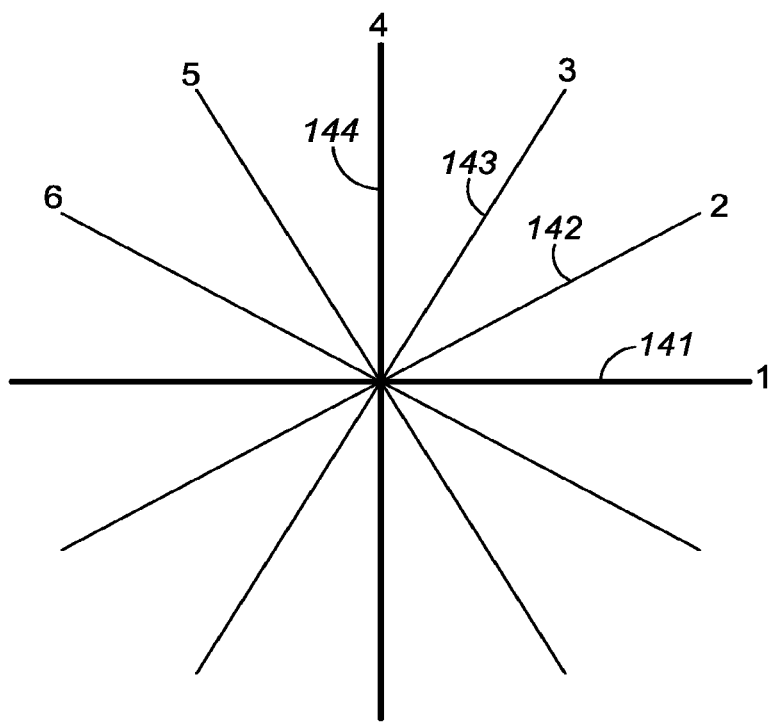
FIG. 5 illustrates an example of sequential polarization direction changes along with the sequential image capture.

FIG. 5 is a schematic showing sequential changes of polarization direction along with the sequential image capture in accordance with some embodiments. In FIG. 5, the images captured by the imaging sensor have four different kinds of polarizations 141, 142, 143, and 144. This approach let every image capture be performed using different light polarization. As a result, the polarization of light that can better go though translucent cover will return valid information to the front-end decoder. After information from all scans is collected, front-end decoder then performs codeword-voting algorithm on the part or entire code and selects informative part. Barcode decoding algorithm for barcode imagers has to be modified accordingly to adapt to the information gathering (scanning) techniques.

Figure 6:
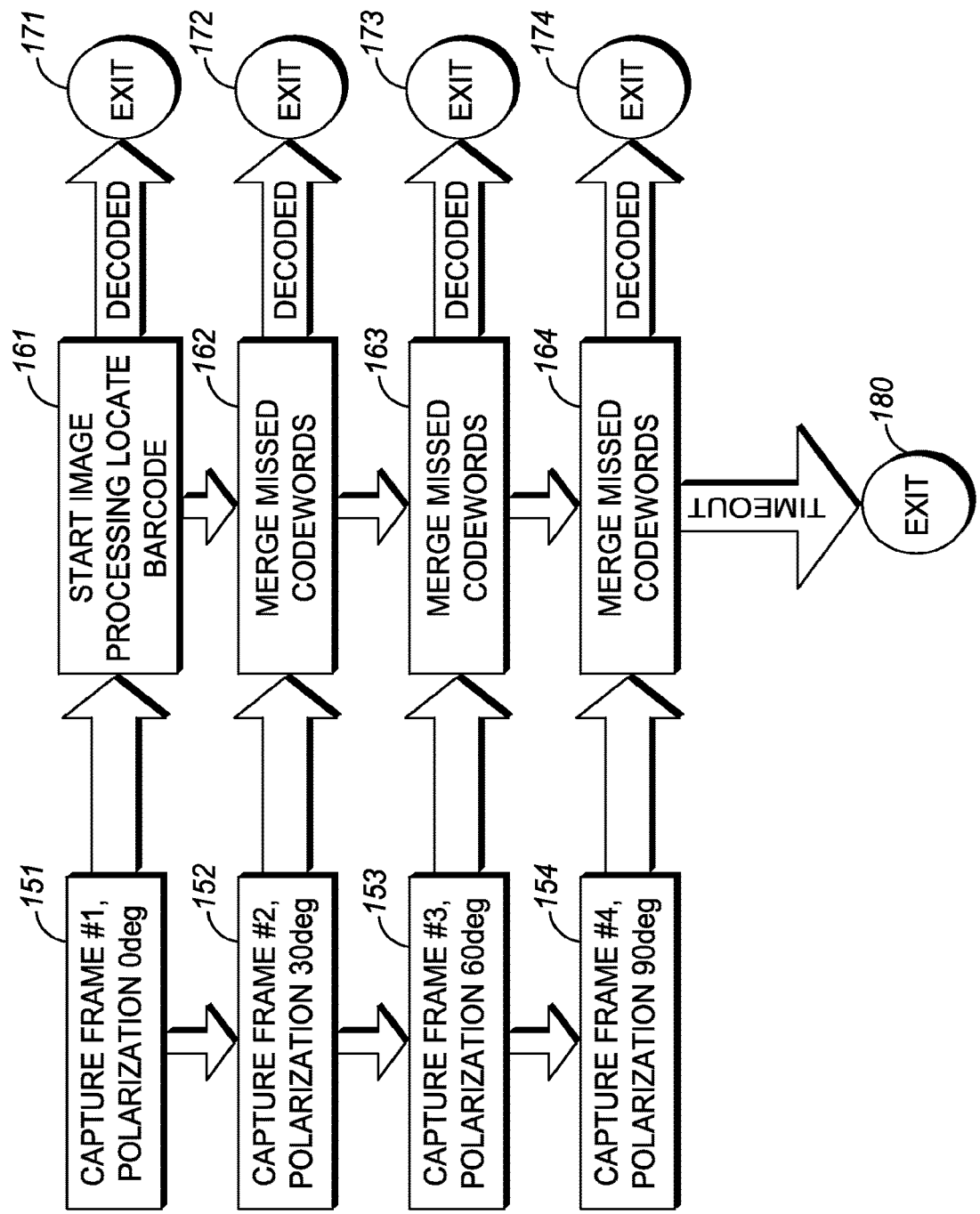
FIG. 6 is a block diagram for barcode decoding algorithm using system with different illumination polarizations in accordance with some embodiments.

FIG. 6 is a block diagram of barcode decoding algorithm using light with different polarization in accordance with some embodiments. In FIG. 6, images at a first frame, a second frame, a third frame, and a fourth frame are captured respectively at block 151 with 0 degree polarization light, at block 152 with 30 degree polarization light, at block 153 with 60 degree polarization light, and at block 154 with 90 degree polarization light. The images captured at the first frame, the second frame, the third frame, and the fourth frame can be processed respectively at blocks 161, 162, 163, and 164. In FIG. 6, image capturing using different light polarization can be performed in a separate thread that does not interfere with image processing. Each subsequent 'image merge' designated to recognize part of the code that may be covered by reflection from the barcode cover. Decoder may exit with success status at any time if sufficient to decode barcode information is recovered. For example, after the image captured at the first frame is processed at block 161, if all needed barcodes can be successfully decoded, the decoder can exit to block 171. If not all needed barcodes can be successfully decoded, the decoder can continue to process the image captured at the second frame at block 162. The decoder continue to process the image captured at the third frame at block 163, and continue to process the image captured at the fourth frame at block 164, until all needed barcodes can be successfully decoded.

In one aspect, what is disclosed is a method of decoding one or more barcodes on a target object with an imaging scanner. The imaging scanner comprises an image sensor and a dynamic linear polarizer. The dynamic linear polarizer is configured to block light with polarization perpendicular to a defined polarization direction. The method includes the following: (1) capturing at least one image of the target object through the dynamic linear polarizer with the imaging sensor while the dynamic linear polarizer is set to a different defined polarization during each of N time periods; and (2) processing at least N images of the target object to decode the one or more barcodes on the target object, wherein the at least N images includes the at least one image that is captured during each of the N time periods. Here, N is an integer that can be three, four, five, six, or other natural numbers.

In some implementations of the method, the above stated processing at least N images of the target object can include processing each of the at least N images of the target object individually for decoding at least one barcode that is decodable. In some implementations, the above stated processing at least N images of the target object can include (1) combining the at least N images of the target object into a single image and (2) processing the single image to decode the one or more barcodes.

In some implementations of the method, the imaging scanner further comprises an auxiliary dynamic linear polarizer, and the method further comprises generating illumination light through the auxiliary dynamic linear polarizer while the auxiliary dynamic linear polarizer is set to a corresponding defined polarization direction during each of the N time periods. Here, capturing at least one image of the target object further comprises capturing the at least one image of the target object while the target object is illuminated by the illumination light through the auxiliary dynamic linear polarizer during each of the N time periods.

In some implementations of the method, the imaging scanner further comprises an auxiliary dynamic linear polarizer, and the method further comprises projecting illumination light on the target object through the auxiliary dynamic linear polarizer while the auxiliary dynamic linear polarizer is set to a corresponding defined polarization direction that is correlated with the defined polarization direction of the dynamic linear polarizer during each of the N time periods. Here, said capturing at least one image of the target object further comprises capturing the at least one image of the target object while the target object is illuminated by the illumination light through the auxiliary dynamic linear polarizer during each of the N time periods.

In one aspect, what is disclosed is a method of a method of decoding one or more barcodes on a target object with an imaging scanner. The imaging scanner comprises an image sensor and an auxiliary dynamic linear polarizer. The dynamic linear polarizer is configured to block light with polarization perpendicular to a defined polarization direction. The method comprises the following: (1) projecting illumination light on the target object through the auxiliary dynamic linear polarizer while the auxiliary dynamic linear polarizer is set to a corresponding defined polarization direction during each of N time periods; (2) capturing the at least one image of the target object while the target object is illuminated by the illumination light through the auxiliary dynamic linear polarizer during each of the N time periods; and (3) processing at least N images of the target object to decode the one or more barcodes on the target object, wherein the at least N images includes at least one image that is captured during each of the N time periods. Here, N is an integer that can be three, four, five, six, or other natural numbers.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of decoding one or more barcodes on a target object with an imaging scanner that comprises an image sensor and a dynamic linear polarizer, with the dynamic linear polarizer being configured to block light with polarization perpendicular to a defined polarization direction, the method comprising:

capturing at least a first image of the target object through the dynamic linear polarizer with the imaging sensor during a first time period while the dynamic linear polarizer is set to a first defined polarization direction;

capturing at least a second image of the target object through the dynamic linear polarizer with the imaging sensor during a second time period while the dynamic linear polarizer is set to a second defined polarization direction;

capturing at least a third image of the target object through the dynamic linear polarizer with the imaging sensor during a third time period while the dynamic linear polarizer is set to a third defined polarization direction;

processing each of the first image of the target object, the second image of the target object, and the third image of the target object to obtain, respectively, a first part of a code encoded by the one or more barcodes on the target object, a second part of the code encoded by the one or more barcodes on the target object, and a third part of the code encoded by the one or more barcodes on the target object;

merging the first part, the second part, and the third part to decode the one or more barcodes on the target object; and wherein the first defined polarization, the second defined polarization, and the third defined polarization are all different from each other.

2. The method of claim 1, wherein the imaging scanner further comprises an auxiliary dynamic linear polarizer, the method further comprising:

projecting illumination light on the target object through the auxiliary dynamic linear polarizer during the first time period while the auxiliary dynamic linear polarizer has the defined polarization direction thereof set to the direction that is substantially perpendicular the first defined polarization direction;

projecting illumination light on the target object through the auxiliary dynamic linear polarizer during the second time period while the auxiliary dynamic linear polarizer has the defined polarization direction thereof set to the direction that is substantially perpendicular the second defined polarization direction; and projecting illumination light on the target object through the auxiliary dynamic linear polarizer during the third time period while the auxiliary dynamic linear polarizer has the defined polarization direction thereof set to the direction that is substantially perpendicular the third defined polarization direction.

3. The method of claim 1, further comprising:

capturing at least a fourth image of the target object through the dynamic linear polarizer with the imaging sensor during a fourth time period while the dynamic linear polarizer is set to a fourth defined polarization direction;

processing the fourth image of the target object to obtain a fourth part of the code encoded by the one or more barcodes on the target object;

merging the fourth part with the first part, the second part, and the third part to decode the one or more barcodes on the target object; and wherein the first defined polarization, the second defined polarization, the third defined polarization, and the fourth defined polarization direction are all different from each other.

4. A method of decoding one or more barcodes on a target object with an imaging scanner that comprises an image sensor and a dynamic linear polarizer, with the dynamic linear polarizer being configured to block light with polarization perpendicular to a defined polarization direction, the method comprising:

capturing at least one image of the target object through the dynamic linear polarizer with the imaging sensor while the dynamic linear polarizer is set to a different defined polarization during each of N time periods, with N being an integer that is at least three; and processing at least N images of the target object to decode the one or more barcodes on the target object, wherein the at least N images includes the at least one image that is captured during each of the N time periods.

5. The method of claim 4, wherein N is an integer that is at least four.

6. The method of claim 4, wherein said processing at least N images of the target object comprises:

processing each of the at least N images of the target object individually for decoding at least one barcode that is decodable.

7. The method of claim 4, wherein said processing at least N images of the target object comprises:

combining the at least N images of the target object into a single image; and processing the single image to decode the one or more barcodes.

8. The method of claim 4, wherein the imaging scanner further comprises an auxiliary dynamic linear polarizer, the method further comprising:

generating illumination light through the auxiliary dynamic linear polarizer while the auxiliary dynamic linear polarizer is set to a corresponding defined polarization direction during each of the N time periods; and wherein said capturing at least one image of the target object further comprises capturing the at least one image of the target object while the target object is illuminated by the illumination light through the auxiliary dynamic linear polarizer during each of the N time periods.

9. The method of claim 4, wherein the imaging scanner further comprises an auxiliary dynamic linear polarizer, the method further comprising:

projecting illumination light on the target object through the auxiliary dynamic linear polarizer while the auxiliary dynamic linear polarizer is set to a corresponding defined polarization direction that is correlated with the defined polarization direction of the dynamic linear polarizer during each of the N time periods; and wherein said capturing at least one image of the target object further comprises capturing the at least one image of the target object while the target object is illuminated by the illumination light through the auxiliary dynamic linear polarizer during each of the N time periods.

10. A method of decoding one or more barcodes on a target object with an imaging scanner that comprises an image sensor and a dynamic linear polarizer, with the dynamic linear polarizer being configured to block light with polarization perpendicular to a defined polarization direction, the method comprising:

projecting illumination light on the target object through the auxiliary dynamic linear polarizer while the auxiliary dynamic linear polarizer is set to a corresponding defined polarization direction during each of N time periods, with N being an integer that is at least three;

capturing the at least one image of the target object while the target object is illuminated by the illumination light through the auxiliary dynamic linear polarizer during each of the N time periods; and processing at least N images of the target object to decode the one or more barcodes on the target object, wherein the at least N images includes the at least one image that is captured during each of the N time periods.

11. The method of claim 10, wherein N is an integer that is at least four.

12. An apparatus for decoding one or more barcodes on a target object comprising:

an illumination light source;

an auxiliary dynamic linear polarizer configured to generate illumination light by passing light from the illumination light source through the auxiliary dynamic linear polarizer;

an imaging sensor having photosensitive elements configured to capture at least one image of the target object while the target object is illuminated by the illumination light through the auxiliary dynamic linear polarizer during each of N time periods, with the auxiliary dynamic linear polarizer being set to a different defined polarization during each of the N time periods, wherein N is an integer that is at least three; and a controller configured to process at least N images of the target object to decode the one or more barcodes on the target object, wherein the at least N images includes at least one image that is captured during each of the N time periods.

* * * * *